United States Patent
Xiong et al.

(10) Patent No.: US 10,635,118 B2
(45) Date of Patent: Apr. 28, 2020

(54) METHOD, TERMINAL DEVICE, AND COMPUTER READABLE STORAGE MEDIUM FOR CONTROLLING ROTATION OF SERVO

(71) Applicant: UBTECH Robotics Corp, Shenzhen (CN)

(72) Inventors: Youjun Xiong, Shenzhen (CN); Wenhua Fan, Shenzhen (CN); Hanyu Sun, Shenzhen (CN); Zhongliang Wang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/161,093

(22) Filed: Oct. 16, 2018

(65) Prior Publication Data

US 2019/0163209 A1    May 30, 2019

(30) Foreign Application Priority Data

Nov. 29, 2017    (CN) .......................... 2017 1 1229241

(51) Int. Cl.
*G05D 13/62* (2006.01)
*G05B 17/02* (2006.01)

(52) U.S. Cl.
CPC ............. *G05D 13/62* (2013.01); *G05B 17/02* (2013.01)

(58) Field of Classification Search
None
See application file for complete search history.

(56) References Cited

U.S. PATENT DOCUMENTS

| | | | | |
|---|---|---|---|---|
| 4,891,764 A | * | 1/1990 | McIntosh | A63B 24/00 318/432 |
| 5,274,316 A | * | 12/1993 | Evans | H02P 8/04 318/443 |
| 5,748,591 A | * | 5/1998 | Nakai | G11B 7/0945 369/190 |
| RE39,906 E | * | 11/2007 | Roston | F16F 15/00 318/561 |

\* cited by examiner

*Primary Examiner* — Sean Shechtman

(57) ABSTRACT

The present disclosure relates to a method, a terminal device, and a computer readable storage medium for controlling rotation of a servo. The method includes: acquiring a loading mass and a rotation radius of the servo from a sensor electrically connected with the servo or by an externally input; calculating an angular acceleration threshold of the servo according to an angular acceleration formula, a rated torque, the loading mass, and the rotation radius of the servo; setting an angular acceleration of the servo according to the angular acceleration threshold; and rotating the servo according to the angular acceleration.

10 Claims, 6 Drawing Sheets

METHOD, TERMINAL DEVICE, AND COMPUTER READABLE STORAGE MEDIUM FOR CONTROLLING ROTATION OF SERVO

CROSS REFERENCE TO RELATED APPLICATIONS

This application claims priority to Chinese Patent Application No. 201711229241.3, filed Nov. 29, 2017, which is hereby incorporated by reference herein as if set forth in its entirety.

BACKGROUND

1. Technical Field

The present disclosure relates to computer technology, and particularly to a method, a terminal device, and a computer readable storage medium for controlling angular acceleration of a servo.

2. Description of Related an

At present, due to the rise of the humanoid robot industry, servos have been widely used as a core component in robot joints. However, the gear of the gearbox has a large influence on the overall life of the servo. In the acceleration phase of and the speed reduction phase of the servo, there will be a sudden acceleration. If the load is too heavy, the gear of the gearbox will suddenly receive a large force, the gears may collide with each other. This may damage the gears, and thus the life cycle of the gear may be limited. To increase the life cycle of the gear, it is common practice to improve the material and manufacturing process of the gear, which may result in an increasing cost.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

FIG. 5 is a graph showing an acceleration phase, uniform speed phase, and a deceleration phase of the servo 6 under the existing orbit according to an embodiment of the present disclosure. Specifically.

FIG. 6 is a graph showing an acceleration phase, uniform speed phase, and a deceleration phase of the servo 6 under an acceleration orbit according to an embodiment of the present disclosure. Specifically.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

For the purpose of describing the technical solutions of the present disclosure, the following describes through specific embodiments.

Figure 1:
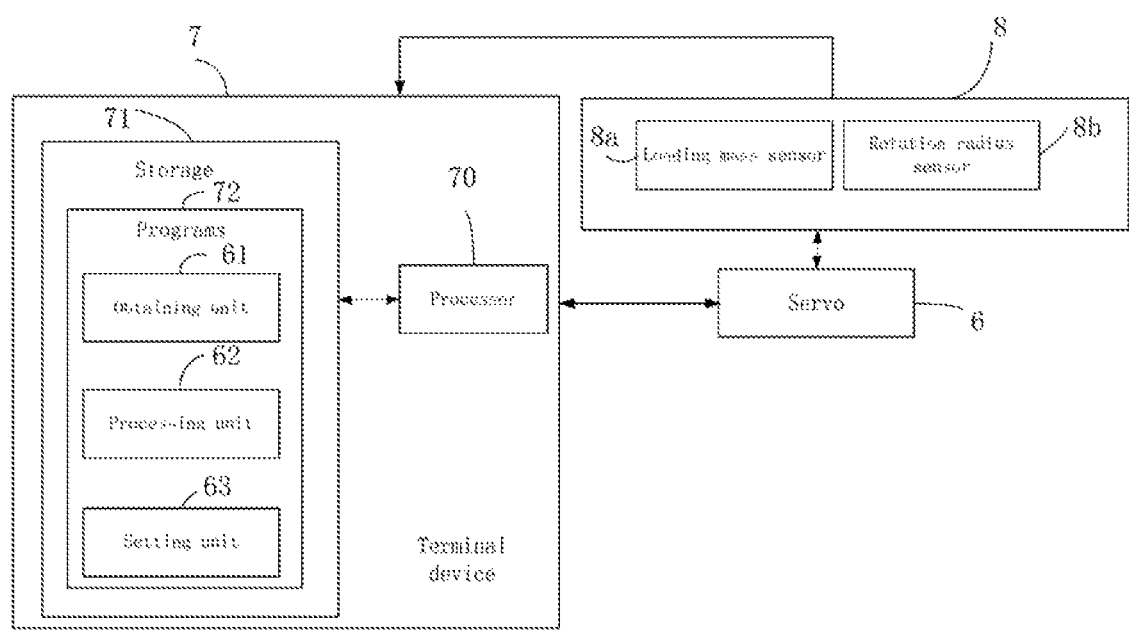
FIG. 1 is a schematic diagram of a terminal for controlling angular acceleration of a servo according to an embodiment of the present disclosure.

FIG. 1 is a schematic diagram of a servo 6, a computing terminal device 7 for controlling angular acceleration of the servo 6, and at least one sensor 8 according to an embodiment of the present disclosure. For the convenience of description, only the parts related to this embodiment are shown. As shown in FIG. 1, in this embodiment, a computing terminal device 7 for controlling angular acceleration of the servo 6 includes an obtaining unit 61, a processing unit 62, and a setting unit 63.

The obtaining unit 61 is configured to, in step S101, acquire a loading mass and a rotation radius of a servo 6.

The processing unit 62 is configured to, in step S102, calculate an angular acceleration threshold of the servo 6 according to an angular acceleration formula, a rated torque, the loading mass, and the rotation radius of the servo 6.

The setting unit 63 is configured to, in step S103, set an angular acceleration of the servo 6 according to the angular acceleration threshold.

The computing terminal device 7 is configured to rotate the servo 6 according to the angular acceleration of the servo.

In an example, the angular acceleration formula is expressed as:

$$a = \frac{T}{mr^2}$$

Wherein a is the angular acceleration of the servo, T is the rated torque of the servo, m is the loading mass of the servo, and r is the rotation radius of the servo.

In an example, the setting unit 63 is configured to obtain a first value by multiplying a default coefficient and the angular acceleration threshold and to set the first value as the angular acceleration of the servo 6.

In an example, the setting unit 63 is configured to:

obtain a first angular acceleration input by an user;

compare the first angular acceleration with the angular acceleration threshold; and set the first angular acceleration as the angular acceleration of the servo 6 upon determining the first angular acceleration is less than or equal to the angular acceleration threshold.

If the first angular acceleration is greater than the angular acceleration threshold, a prompt message is issued.

In an example, the setting unit 63 is further configured to:

obtain at least one instruction input by the user; and set the first angular acceleration as the angular acceleration of the servo 6 upon determining the instruction is a confirmation.

If the instruction is indicative of a cancellation, the process goes to the obtaining step.

In view of the above, the loading mass and the rotation radius are obtained to calculate the loading of the servo 6. The angular acceleration threshold is calculated according to the angular acceleration formula, the rated torque, the loading mass and the radius rotation of the servo 6. As such, the acceleration of the servo 6 is controlled according to the loading of the servo 6. In this way, the gears of the gearbox may be well maintained during the acceleration and deceleration phase of the servo 6.

As shown in FIG. 1, the terminal device 7 includes, but is not limited to, a processor 70, a storage 71, and at least one computer program 72 stored in the storage 71 and executable on the processor 70. The servo 6 is electrically connected to the sensor 8. When the processor 70 executes the computer program 72, the steps in the above embodiments of the servo controlling method are implemented, such as steps S101 to S103. Alternatively, when the processor 70 executes the computer program 72, the functions of each of the modules/units in the above-mentioned device embodiments, for example, the functions of the units 61-63 as shown in FIG. 1, are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 of the terminal device 7. In an example, the computer program 72 may be divided into the obtaining unit 61, the processing unit 62, and the setting unit 63.

It can be understood by those skilled in the art that FIG. 1 is merely an example of the terminal device 7 and does not constitute a limitation on the terminal device 7, and may include more or fewer components than those shown in the figure, or a combination of some components or different components. For example, the terminal device 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the terminal device 7, for example, a hard disk or a storage of the terminal device 7. The storage 71 may also be an external storage device of the terminal device 7, for example, a plug-in hard disk, a smart media card (SMC), a secure digital (SD) card, flash card, and the like, which is equipped on terminal device 7. Furthermore, the storage 71 may further include both an internal storage unit and an external storage device, of the terminal device 7. The storage 71 is configured to store the computer program and other programs and data required by the terminal device 7. The storage 71 may also be used to temporarily store data that has been or will be output.

Figure 2:
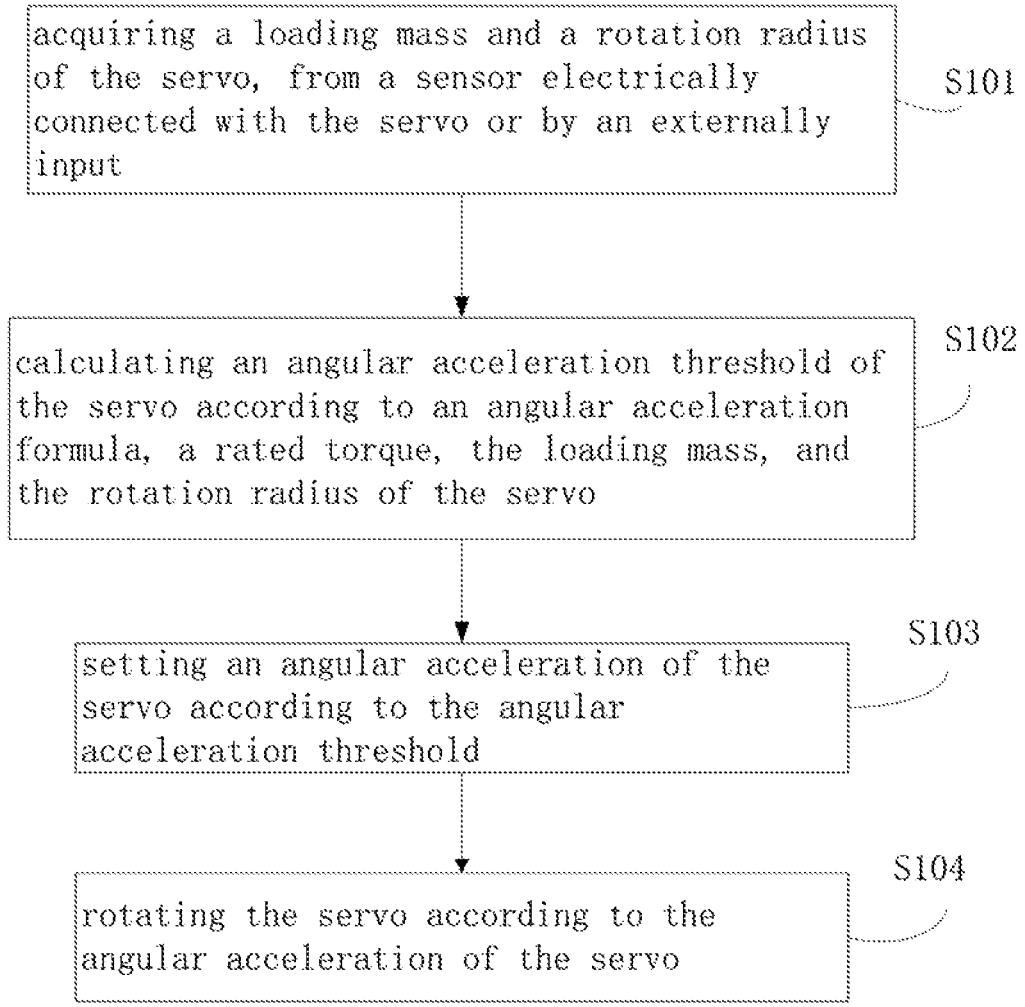
FIG. 2 is a flow chart of a method for controlling angular acceleration of a servo according to an embodiment of the present disclosure.

FIG. 2 is a flow chart of a method for controlling angular acceleration of a servo according to an embodiment of the present disclosure.

In step S101, acquiring a loading mass and a rotation radius of a servo 6.

In an example, the loading mass is the mass of the loading on the servo 6. As an implementation, the loading mass can be automatically obtained. For example, if the robot is loaded with a loading mass sensor 8a (such as a weight sensor), the loading mass of the servo 6 can be obtained from the loading mass sensor 8a. Specifically, the loading mass may be obtained from the loading mass sensor 8a at a default frequent interval; or the motion state of the servo 6 may be predicted. When the servo 6 is predicted to be accelerated or decelerated, the loading mass is obtained from the loading mass sensor 8a.

In another example, the loading mass may be acquired by an externally input, i.e., input by the user. In some cases, the user clearly knows the loading mass on the servo 6, and at this point, the loading mass input by the user can be directly obtained. In addition, the loading mass obtained from the loading mass sensor 8a can be provided to the user, and the user can confirm or correct the loading mass information obtained from the loading mass sensor.

The rotation radius refers to the rotation radius of a center of the loading mass of the servo 6 with respect to the output shaft of the servo 6. In an example, the rotation radius can be automatically obtained. For example, if the robot is loaded with a rotation radius sensor 8b (such as a distance sensor, a position sensor, etc.), the rotation radius can be obtained from the rotation radius sensor 8b. Specifically, the rotation radius may be obtained from the rotation radius sensor 8b at a default frequent interval; or the motion state of the servo 6 may be predicted. When the servo 6 is predicted to be accelerated or decelerated, the rotation radius is obtained from the rotation radius sensor 8b. In another example, after receiving the command input by the user, the rotation radius is obtained from the rotation radius sensor 8b.

In addition, information such as loading volume, loading shape, loading mass, and loading position can be obtained, and the rotation radius of the servo 6 can be calculated based on the information.

In another example, the rotation radius may be acquired by an externally input, i.e., input by the user. In some cases, the user clearly knows the rotation radius of the servo 6, and thus the rotation radius may be directly obtained by user input. In addition, the rotation radius obtained from the rotation radius sensor 8b can be provided to the user so as to be confirmed or corrected.

In step S102, calculating an angular acceleration threshold of the servo 6 according to an angular acceleration formula, a rated torque, the loading mass, and the rotation radius of the servo 6.

In an example, the rated torque of the servo 6 is the theoretical rated torque of the servo 6. The rated torque can automatically obtained or can be input from the user. The rated motor torque of the servo 6, the gear reduction ratio and the reduction gearbox efficiency may also be obtained. The rated torque can be calculated according to the rated motor torque, the gear reduction ratio and the efficiency of the reduction gearbox.

According to the angular acceleration formula, the servo rated torque, the loading mass, and the rotation radius, the angular acceleration threshold of the servo 6 can be calculated. If the rated torque, the loading mass and the rotation radius remain the same, if the acceleration of the servo 6 in the acceleration phase and the deceleration phase is less than or equal to the angular acceleration threshold, the gear of the gearbox is within the allowable range, and the collision between the gears is weak. As such, the gear loss of the gearbox is small, and the impact on the life cycle of the gear is small. If the acceleration of the servo 6 in the acceleration phase and the deceleration phase is greater than the angular acceleration threshold, the gear of the gearbox exceeds the allowable force. The life cycle of the gear is greatly affected.

In an example, the angular acceleration formula is expressed as:

$$a = \frac{T}{mr^2} \quad (1)$$

Wherein a is the angular acceleration in rad/S², T is the rated torque in N*m, m is the loading mass in Kg, and r is the rotation radius in "m"; the loading moment inertia can be obtained by mr², that is, I is the loading moment inertia in Kg*m2. Therefore, the angular acceleration formula can also be expressed as:

$$a = \frac{T}{I} \quad (2)$$

It can be seen from the angular acceleration formula that if the loading mass or the rotation radius is larger, the loading moment inertia is larger, and the angular acceleration threshold is smaller.

In step S103, setting an angular acceleration of the servo 6 according to the angular acceleration threshold.

In step S104, rotating the servo 6 according to the angular acceleration of the servo 6.

In an embodiment, the acceleration of the servo 6 in the acceleration phase or the deceleration phase can be set according to the angular acceleration threshold, thereby avoiding the loss of the gearbox due to the large acceleration of the servo 6 in the acceleration phase or the deceleration phase. Specifically, according to the angular acceleration threshold, a value less than or equal to the angular acceleration threshold may be automatically set as an angular acceleration of the servo 6 according to a certain default rule; or the angular acceleration threshold may be notified to the user such that the user may input the angular acceleration threshold setting as the angular acceleration of the servo 6. Alternatively, the current angular acceleration of the servo 6 is obtained, and the angular acceleration of the servo 6 is adjusted by comparing the current angular acceleration and the angular acceleration threshold of the servo 6.

In an example, the step S103 may include: obtain a first value by multiplying a default coefficient and the angular acceleration threshold and to set the first value as the angular acceleration of the servo 6.

In this embodiment, the default coefficient may be automatically set or set by user input. For example, the default coefficient may be 100%, 60%, or the like. In another example, a plurality of default coefficients may be set. Each default coefficient corresponds to one gear position. The device 7 automatically selects the gear position according to the movement condition of the servo 6, or the user selects the gear position according to the actual demand, thereby controlling the angular acceleration of the servo 6. For example, the high, medium and low third gears are set, wherein the default coefficients respectively correspond to the high-range, the mid-range position, and the low-range position are 120%, 80%, and 40%. Assuming that the angular acceleration threshold is "a", if the device 7 determines that the servo 6 requires a large angular acceleration according to the movement of the servo 6 or the user, the high-range can be selected, and the angular acceleration of the servo 6 is 120%*"a". By setting the high-range to realize a large angular acceleration, the life cycle of the gear is sacrificed to meet the current demand. When a larger angular acceleration is not needed, the angular acceleration of the servo 6 may be selected to be 40%*"a". Under the circumstance, the gear loss may be reduced so as to extend the life cycle of the gear.

Figure 3:
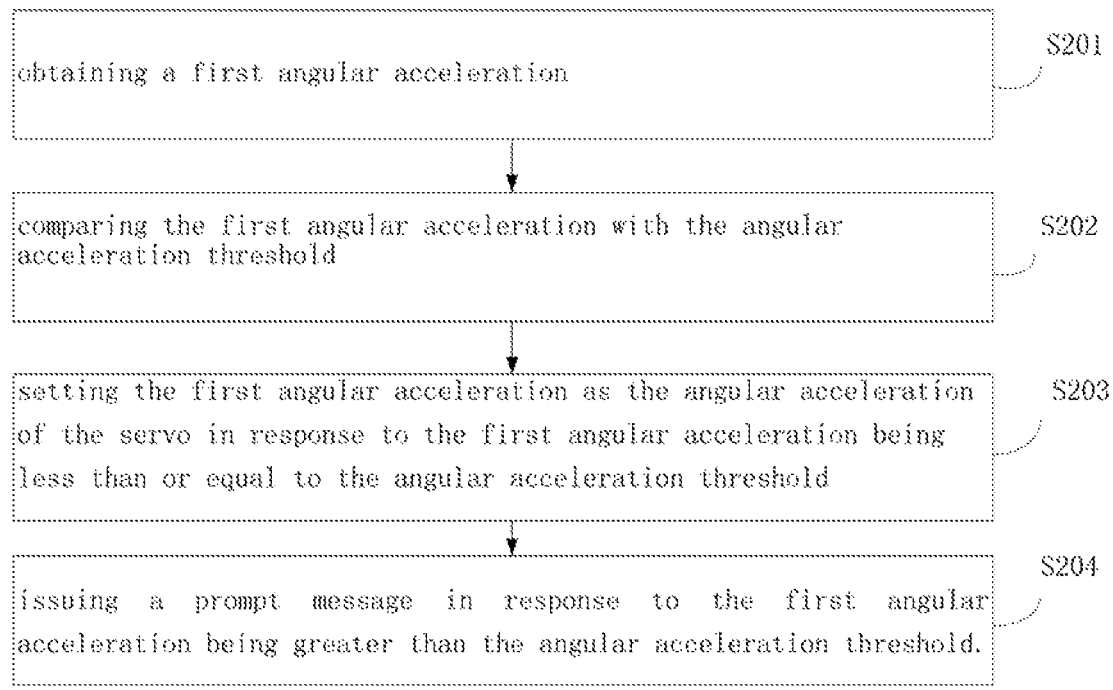
FIG. 3 is a flow chart illustrating the step of configuring a servo angular acceleration according to an angular acceleration threshold of the angular acceleration controlling method according to an embodiment of the present disclosure.

In an example, as shown in FIG. 3, the step S103 may further include:

In step S201, obtaining a first angular acceleration input by an user;

In step S202, comparing the first angular acceleration with the angular acceleration threshold; and In step S203, setting the first angular acceleration as the angular acceleration of the servo 6 upon determining the first angular acceleration is less than or equal to the angular acceleration threshold.

In step S204, if the first angular acceleration is greater than the angular acceleration threshold, a prompt message is issued.

In this embodiment, the first angular acceleration input by the user is determined by using the angular velocity threshold to determine whether the first angular acceleration input by the user causes a large gear loss. On the one hand, it is convenient for the user to set the angular acceleration of the servo 6. In addition, the user can be reminded when the angular acceleration set by the user may cause a large gear loss.

Figure 4:
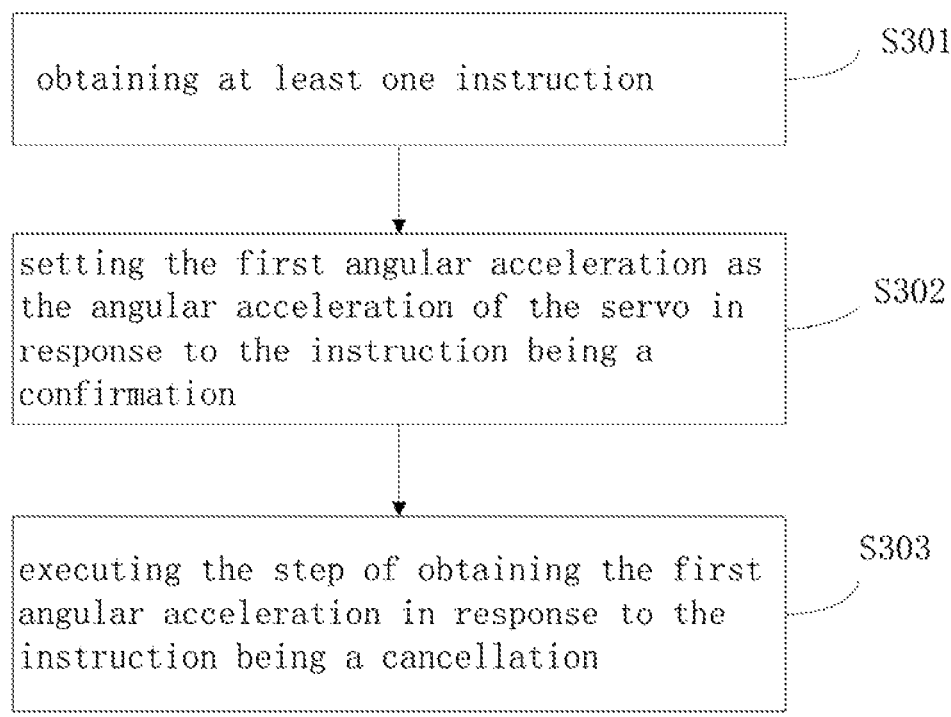
FIG. 4 is a flow chart illustrating the step of obtaining an user command of the angular acceleration controlling method according to an embodiment of the present disclosure.

In an example, as shown in FIG. 4, after the prompt message is issued, the step S204 further includes:

In step S301, obtaining at least one instruction input by the user;

In step S302, setting the first angular acceleration as the angular acceleration of the servo 6 upon determining the instruction is a confirmation.

In step S303, the process goes to step S301 upon determining the instruction is indicative of a cancellation.

Figure 5A:
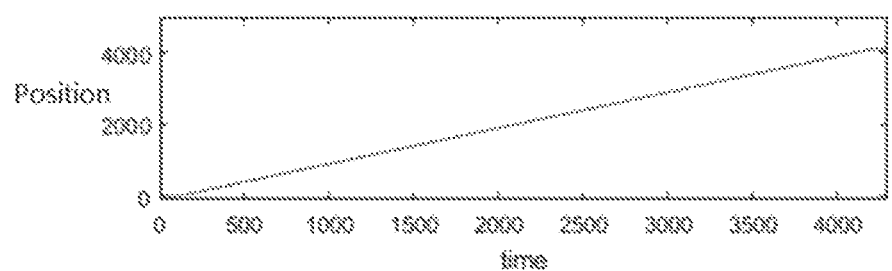
FIG. 5A shows a relationship between the servo position and time.
Figure 5B:
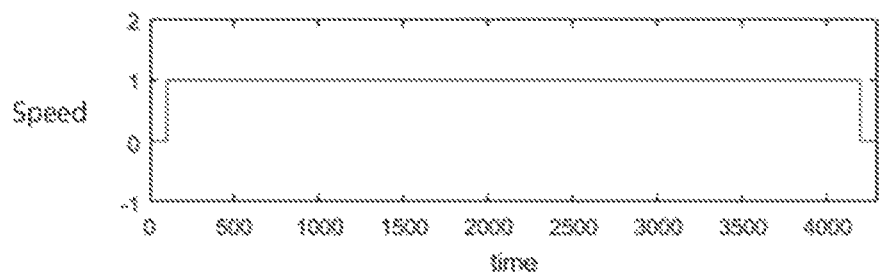
FIG. 5B shows a relationship between the servo speed and time.
Figure 5C:
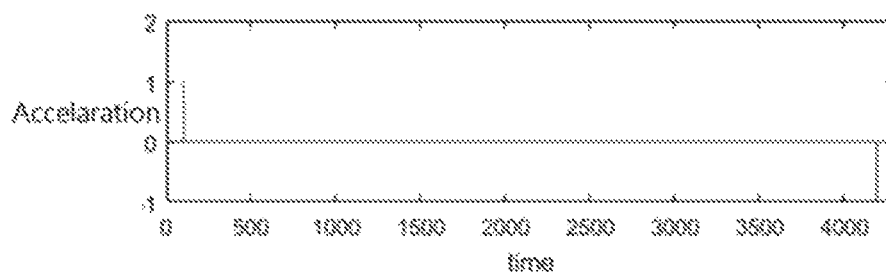
FIG. 5C shows a relationship between the servo acceleration and time.

Conventionally, only the speed trajectory planning is available. FIG. 5 is a graph showing the servo 6 in the acceleration, uniform speed and deceleration phases under the speed trajectory planning. FIG. 5A is the relationship between the servo position and time, and FIG. 5B is the relationship between the servo speed and time. FIG. 5C is the relationship between the servo acceleration and time. As can be seen from the figures, the gearbox has a very large sudden acceleration in the acceleration and deceleration phases. If it is heavy loaded, the gear will be stressed (according to the dynamic formula F=m*a, where F is the force, m is the mass, "a" is the acceleration), which causes loss to the gear and affects the life cycle of the gear.

Figure 6A:
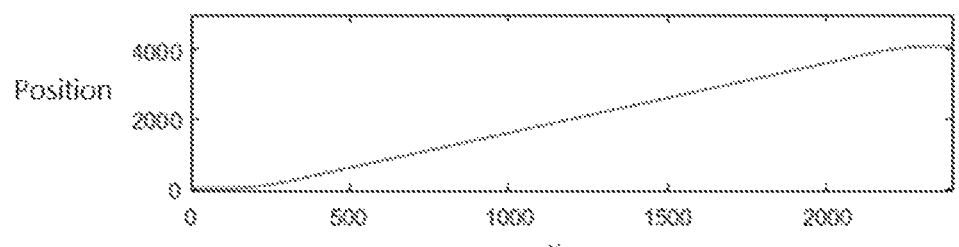
FIG. 6A shows a relationship between the servo position and time.
Figure 6B:
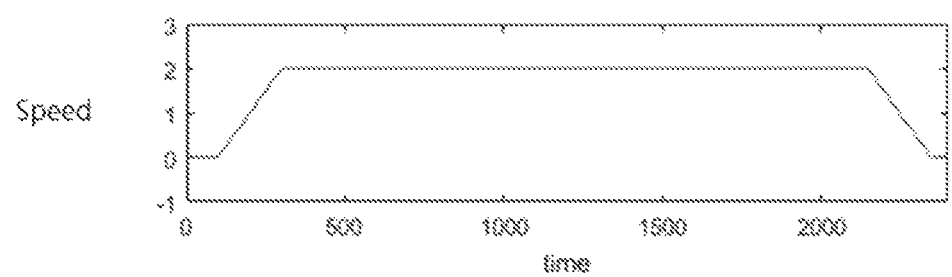
FIG. 6B shows a relationship between the servo speed and time.
Figure 6C:
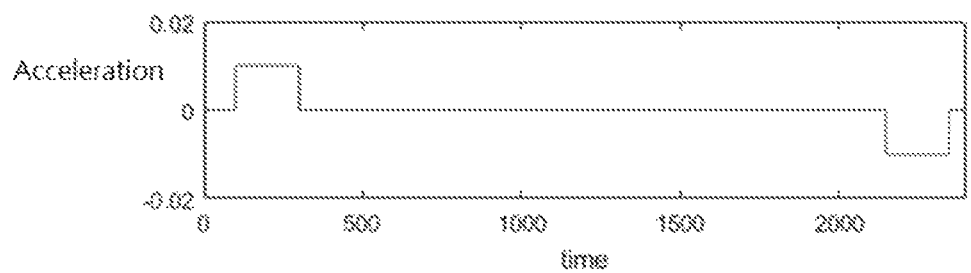
FIG. 6C shows a relationship between the servo acceleration and time.

In the embodiment, the acceleration trajectory planning is implemented by calculating the angular acceleration threshold of the servo 6 and setting the angular acceleration of the servo 6 according to the angular acceleration threshold. FIG. 6 is a graph showing the servo 6 in the acceleration, uniform speed and deceleration phases under the acceleration trajectory planning. FIG. 6A is the relationship between the servo position and time, and FIG. 6B is the relationship between the servo speed and time. FIG. 6C is a relationship between the servo acceleration and time. Comparing FIGS. 5A-5C with FIGS. 6A-6C, it can be seen that the same displacement of the servo movement, the angular acceleration of the servo 6 in the acceleration phase and the deceleration phase is relatively small, so the average force of the gearbox is also relatively small. This avoids the situation where the gear suddenly collides during the movement. In addition, the life cycle of the gearbox is extended without increasing the material cost.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for controlling rotation of a servo, comprising executing on a processor steps of:
   acquiring a loading mass and a rotation radius of the servo, from a sensor electrically connected with the servo or by an externally input;
   calculating an angular acceleration threshold of the servo according to an angular acceleration formula, a rated torque, the loading mass, and the rotation radius of the servo;
   setting an angular acceleration of the servo according to the angular acceleration threshold;
   rotating the servo according to the angular acceleration of the servo;
   wherein the angular acceleration formula is expressed as:

$$a = \frac{T}{mr^2};$$

wherein a is the angular acceleration of the servo, T is the rated torque of the servo, m is the loading mass of the servo, and r is the rotation radius of the servo;
   wherein the setting step further comprises:
      obtaining a first value by multiplying a default coefficient and the angular acceleration threshold; and
      setting the first value as the angular acceleration of the servo; and
   wherein the setting step further comprises:
      obtaining a first angular acceleration;
      comparing the first angular acceleration with the angular acceleration threshold;
      setting the first angular acceleration as the angular acceleration of the servo in response to the first angular acceleration being less than or equal to the angular acceleration threshold; and
      issuing a prompt message in response to the first angular acceleration being greater than the angular acceleration threshold.

2. The method as claimed in claim 1, wherein the issuing step further comprises:
   obtaining at least one instruction;
   setting the first angular acceleration as the angular acceleration of the servo in response to the instruction being a confirmation; and
   executing the step of obtaining the first angular acceleration in response to the instruction being a cancellation.

3. The method as claimed in claim 1, wherein the sensor is a loading mass sensor that determines the loading mass at a default frequent interval or in response to a determination of acceleration or deceleration of the servo.

4. The method as claimed in claim 1, wherein the sensor is a rotation radius sensor that determines the rotation radius at a default frequent interval or in response to a determination of acceleration or deceleration of the servo.

5. A computing terminal device for controlling rotation of a servo, comprising:
   one or more processors;
   a storage; and
   one or more computer programs stored in the storage and configured to be executed by the one or more processors, and the one or more computer programs controlling the computing terminal device to:
      acquire a loading mass and a rotation radius of a servo, from a sensor electrically connected with the servo or by an externally input;
      calculate an angular acceleration threshold of the servo according to an angular acceleration formula, a rated torque, the loading mass, and the rotation radius of the servo;
      set an angular acceleration of the servo according to the angular acceleration threshold; and
      rotate the servo according to the angular acceleration of the servo;
      wherein the angular acceleration formula is expressed as:

$$a = \frac{T}{mr^2};$$

wherein a is the angular acceleration of the servo, T is the rated torque of the servo, m is the loading mass of the servo, and r is the rotation radius of the servo;
   wherein the one or more computer programs controls the terminal device to:
      obtain a first value by multiplying a default coefficient and the angular acceleration threshold; and
      set the first value as the angular acceleration of the servo; and
   wherein the one or more computer programs controls the terminal device to:
      obtain a first angular acceleration:
      compare the first angular acceleration with the angular acceleration threshold:
      set the first angular acceleration as the angular acceleration of the servo in response to the first annular acceleration being less than or equal to the angular acceleration threshold; and
      issue a prompt message in response to the first angular acceleration being greater than the angular acceleration threshold.

6. The computing terminal device as claimed in claim 5, wherein the one or more computer programs controls the terminal device to:
   obtain at least one instruction;
   set the first angular acceleration as the angular acceleration of the servo in response to the instruction being a confirmation; and
   execute the step of obtaining the first angular acceleration in response to the instruction being a cancellation.

7. A non-transitory computer readable storage medium having stored therein instructions, which when executed by a processor, cause the processor to:
   acquire a loading mass and a rotation radius of a servo, from a sensor electrically connected with the servo or by an externally input;
   calculate an angular acceleration threshold of the servo according to an angular acceleration formula, a rated torque, the loading mass, and the rotation radius of the servo;

set an angular acceleration of the servo according to the angular acceleration threshold; and
rotate the servo according to the angular acceleration of the servo;
wherein the angular acceleration formula is expressed as:

$$a = \frac{T}{mr^2};$$

wherein a is the angular acceleration of the servo, T is the rated torque of the servo, m is the loading mass of the servo, and r is the rotation radius of the servo;
wherein the processor further:
obtains a first value by multiplying a default coefficient and the angular acceleration threshold; and
sets the first value as the angular acceleration of the servo; and
wherein the processor further:
obtains a first angular acceleration;
compares the first angular acceleration with the angular acceleration threshold:
sets the first angular acceleration as the angular acceleration of the servo in response to the first angular acceleration being less than or equal to the angular acceleration threshold; and
issues a prompt message in response to the first angular acceleration being greater than the annular acceleration threshold.

8. The non-transitory computer readable storage medium as claimed in claim 7, wherein the processor further:
obtains at least one instruction;
sets the first angular acceleration as the angular acceleration of the servo in response to the instruction being a confirmation; and
executes the step of obtaining the first angular acceleration in response to the instruction being a cancellation.

9. The non-transitory computer readable storage medium as claimed in claim 7, wherein the sensor is a loading mass sensor that determines the loading mass at a default frequent interval or in response to a determination of acceleration or deceleration of the servo.

10. The non-transitory computer readable storage medium as claimed in claim 7, wherein the sensor is a rotation radius sensor that determines the rotation radius at a default frequent interval or in response to a determination of acceleration or deceleration of the servo.

* * * * *